US011006622B2

(12) United States Patent
Snell et al.

(10) Patent No.: US 11,006,622 B2
(45) Date of Patent: May 18, 2021

(54) PEST-MANAGEMENT APPARATUSES WITH SEPARATOR TO DIRECT RODENT MOVEMENT AND/OR IMPROVE RODENT CONTACT WITH ADHESIVE

(71) Applicant: VM PRODUCTS, INC., Colleyville, TX (US)

(72) Inventors: Eric Snell, Bedford, TX (US); Ethan Vickery, Bedford, TX (US); Larry Covington, Bedford, TX (US)

(73) Assignee: VM PRODUCTS, INC., Colleyville, TX (US)

( * ) Notice: Subject to any disclaimer, the term of this patent is extended or adjusted under 35 U.S.C. 154(b) by 531 days.

(21) Appl. No.: 15/038,104

(22) PCT Filed: Nov. 21, 2014

(86) PCT No.: PCT/US2014/066824
§ 371 (c)(1),
(2) Date: May 20, 2016

(87) PCT Pub. No.: WO2015/077567
PCT Pub. Date: May 28, 2015

(65) Prior Publication Data
US 2016/0286783 A1    Oct. 6, 2016

Related U.S. Application Data

(60) Provisional application No. 61/907,699, filed on Nov. 22, 2013.

(51) Int. Cl.
*A01M 25/00* (2006.01)
*A01M 23/16* (2006.01)
*A01M 23/02* (2006.01)

(52) U.S. Cl.
CPC .......... *A01M 25/004* (2013.01); *A01M 23/02* (2013.01); *A01M 23/16* (2013.01)

(58) Field of Classification Search
CPC .... A01M 23/005; A01M 23/02; A01M 23/16; A01M 25/004
See application file for complete search history.

(56) References Cited

U.S. PATENT DOCUMENTS

| 1,443,287 A | 1/1923 | Snyder et al. |
| 4,400,904 A * | 8/1983 | Baker ................. A01M 25/004 119/52.4 |

(Continued)

FOREIGN PATENT DOCUMENTS

| EP | 0599755 | 6/1994 |
| EP | 0745323 | 12/1996 |

(Continued)

OTHER PUBLICATIONS

Morris et al., "Comparative evaluation of tamper-proof mouse bait station," Proceedings of the Thirteenth Vertebrate Pest Conference, 1988.

*Primary Examiner* — Jessica B Wong
(74) *Attorney, Agent, or Firm* — Norton Rose Fulbright US LLP

(57) ABSTRACT

Pest-management apparatuses (e.g., stations), such as, for example, that can configured to permit a rodent to enter and retrieve a bait and/or become trapped (e.g., adhesive or a snap-trap).

21 Claims, 9 Drawing Sheets

(56) References Cited

U.S. PATENT DOCUMENTS

| | | | | |
|---|---|---|---|---|
| 4,453,337 | A | * | 6/1984 | Williams ............ A01M 25/004 119/51.01 |
| 4,541,198 | A | | 9/1985 | Sherman |
| 4,619,071 | A | * | 10/1986 | Willis ................. A01M 25/004 43/124 |
| 4,660,320 | A | * | 4/1987 | Baker ................. A01M 25/004 43/131 |
| 4,833,819 | A | | 5/1989 | Sherman |
| 5,040,327 | A | | 8/1991 | Stack et al. |
| 5,272,832 | A | | 12/1993 | Marshall et al. |
| 5,448,852 | A | * | 9/1995 | Spragins ............. A01M 25/004 43/131 |
| 5,806,237 | A | | 9/1998 | Nelson et al. |
| 5,966,863 | A | | 10/1999 | Payton et al. |
| 6,082,042 | A | | 7/2000 | Issitt |
| 6,137,415 | A | * | 10/2000 | Rast .................... A01M 23/245 340/384.1 |
| 6,397,517 | B1 | | 6/2002 | Leyerle et al. |
| 6,474,016 | B2 | | 11/2002 | Snell et al. |
| 6,493,988 | B1 | | 12/2002 | Johnson |
| 6,513,283 | B1 | | 2/2003 | Crossen |
| 7,669,363 | B2 | | 3/2010 | Frisch |
| 7,874,098 | B2 | | 1/2011 | Vickery et al. |
| 2004/0181996 | A1 | | 9/2004 | Johnson et al. |
| 2004/0244274 | A1 | | 12/2004 | Dellevigne et al. |
| 2005/0028431 | A1 | | 2/2005 | Hoyes et al. |
| 2005/0102887 | A1 | | 5/2005 | Lang et al. |
| 2006/0117644 | A1 | | 6/2006 | Hoyes et al. |
| 2006/0242890 | A1 | | 11/2006 | Ethan |
| 2006/0265944 | A1 | | 11/2006 | Meier et al. |
| 2008/0072475 | A1 | * | 3/2008 | Nelson ................ A01M 25/004 43/131 |
| 2008/0302000 | A1 | | 12/2008 | Kidder |
| 2009/0229170 | A1 | | 9/2009 | Gaibotti |
| 2009/0307963 | A1 | | 12/2009 | Abbas |
| 2010/0170141 | A1 | | 7/2010 | Cink et al. |
| 2010/0325940 | A1 | | 12/2010 | Pryor et al. |
| 2013/0174470 | A1 | | 7/2013 | Vickery et al. |
| 2013/0333273 | A1 | * | 12/2013 | Esculier ............... A01M 23/02 43/58 |
| 2017/0354139 | A1 | * | 12/2017 | Vickery .............. A01M 23/005 |

FOREIGN PATENT DOCUMENTS

| | | |
|---|---|---|
| GB | 2384966 | 8/2003 |
| WO | WO1999/003340 | 1/1999 |
| WO | WO2001/037651 | 5/2001 |
| WO | WO2003/045138 | 6/2003 |
| WO | WO2005/006857 | 1/2005 |
| WO | WO2012/114263 | 8/2012 |

* cited by examiner

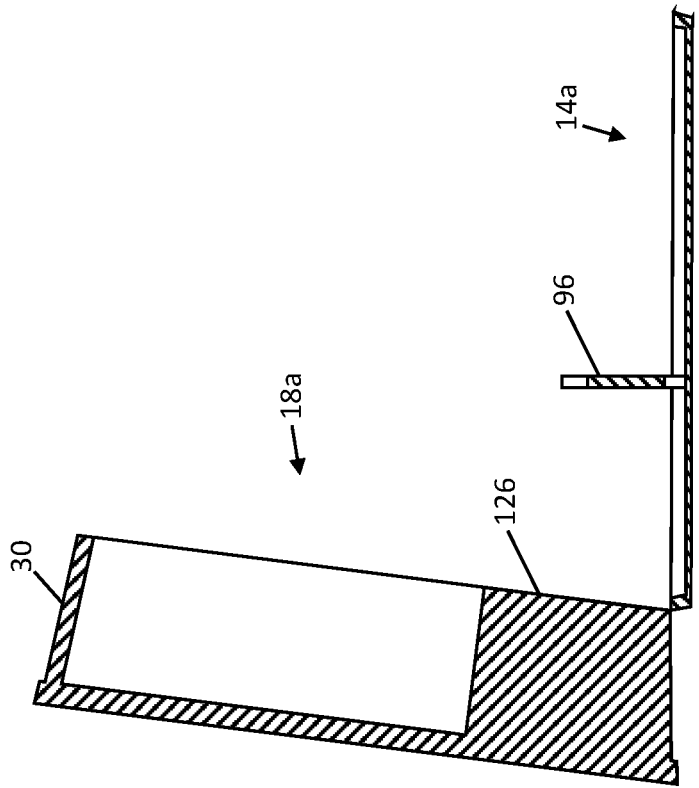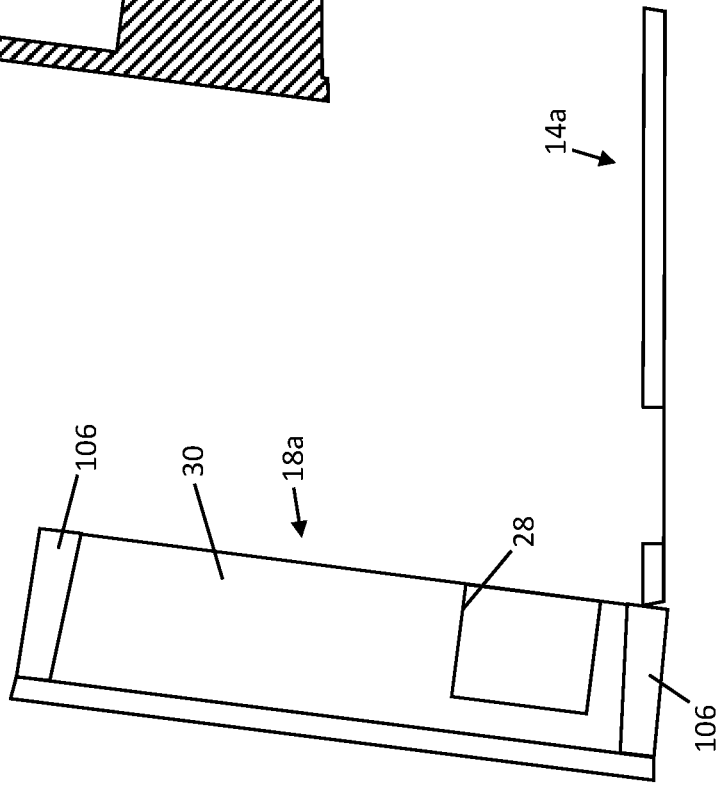

US 11,006,622 B2

PEST-MANAGEMENT APPARATUSES WITH SEPARATOR TO DIRECT RODENT MOVEMENT AND/OR IMPROVE RODENT CONTACT WITH ADHESIVE

PRIORITY CLAIM

This application is a national phase application under 35 U.S.C. § 371 of International Patent Application No. PCT/US2014/066824, filed Nov. 21, 2014, which claims priority to U.S. Provisional Patent Application No. 61/907,699 filed Nov. 22, 2013, the contents of all of which applications are incorporated by reference in their respective entireties.

FIELD OF INVENTION

The present invention relates generally to pest (e.g., rodent) management and, more particularly, but not by way of limitation, to pest-management apparatuses and methods.

BRIEF DESCRIPTION OF RELATED ART

Examples of pest-management apparatuses are disclosed in U.S. Pat. Nos. 4,026,064; 4,208,829; 4,660,320; 5,953,854; 6,082,042; and 6,343,434.

SUMMARY

This disclosure includes embodiments of pest-management apparatuses (e.g., stations or bait stations) and methods of use.

Some embodiments of the present pest-management apparatuses comprise: a base; a lid configured to be coupled to the base such that the base and the lid cooperate to define a chamber having at least one entrance opening sized to permit a rodent to enter the apparatus; and one or more separators configured such that if the lid and base are coupled together to define the chamber, the one or more separators prevent a rodent from accessing at least a portion of the chamber except by climbing over the one or more separators. In some embodiments, the one or more separators are configured such that if the lid and base are coupled together to define the chamber, the one or more separators divide the chamber into a first portion and a second portion.

Some embodiments of the present pest-management apparatuses comprise: a base; and a lid configured to be coupled to the base such that the base and the lid cooperate to define a chamber having at least one entrance opening sized to permit a rodent to enter the apparatus; where at least one of the base and the lid comprises a scented plastic. Some embodiments further comprise: one or more separators configured such that if the lid and base are coupled together to define the chamber, the one or more separators divide the chamber into a rodent capture portion and an entry portion; where the one or more separators are configured to prevent a rodent from traversing from the entry portion to the rodent capture portion except by climbing over the one or more separators. In some embodiments, the one or more separators comprise a scented plastic.

Some of the present pest-management apparatuses comprise: a base; a lid configured to be coupled to the base such that the base and the lid cooperate to define a chamber having at least one entrance opening sized to permit a rodent to enter the apparatus; and one or more separators configured such that if the lid and base are coupled together to define the chamber, the one or more separators divide the chamber into a rodent capture portion and an entry portion; where the one or more separators are configured to prevent a rodent from traversing from the entry portion to the rodent capture portion except by climbing over the one or more separators. In some embodiments, the one or more separators is/are unitary with the base. In other embodiments, the one or more separators is/are unitary with the lid.

In some embodiments, a lower boundary of the one or more separators contacts a floor of the base. In some embodiments, a lower boundary of the one or more separators is spaced from a floor of the base. In some embodiments, an upper boundary of the one or more separators is spaced from the lid by a distance of greater than 0.25 inches. In some embodiments, an upper boundary of the one or more separators is spaced from a floor of the base by 1.5 inches or less. In some embodiments, the one or more separators comprise a translucent material (e.g., a transparent material).

In some embodiments, the one or more separators comprise an elongated member having a planar configuration. In some embodiments, the one or more separators comprise two or more elongated members. In some embodiments, the elongated members each comprises a wire. In some embodiments, the base defines two grooves configured to receive portions of the one or more separators.

In some embodiments, at least one of the base and lid comprises a scented plastic.

In some embodiments, the rodent capture portion and the entry portion are in fluid communication. In some embodiments, each of the one or more separators is coupled to at least one of the lid and the base. In some embodiments, the rodent capture portion is configured to resist a rodent's exit from the apparatus. In some embodiments, the apparatus further comprises an adhesive disposed in the rodent capture portion. In some embodiments, the adhesive comprises an adhesive mat. In some embodiments, the adhesive mat is coupled to the base. In some embodiments, the adhesive mat is releasably coupled to the base. In some embodiments, the one or more separators are substantially perpendicular to the base.

In some embodiments, In some embodiments, the apparatus comprises two entrance openings. In some embodiments, the two entrance openings are disposed on substantially opposite sides of the apparatus. In some embodiments, the two entrance openings are configured such that an axis extends through both openings. In some embodiments, the axis is perpendicular to both openings. In some embodiments, the two entrance openings are in fluid communication with the entry portion of the chamber.

In some embodiments, at least one of the base and the lid comprises a divider configured to prevent a rodent from entering the apparatus through one of the two openings and exiting the apparatus through the other of the two openings without first passing through the rodent capture portion of the chamber. In some embodiments, the divider is further configured to prevent a rodent outside the apparatus from seeing one of the two openings through the other of the two openings. In some embodiments, at least one of the base and the lid comprises a sidewall, and the apparatus is configured such that if the lid is coupled to the base in a closed configuration, the divider extends from the sidewall. In some embodiments, the base comprises the sidewall. In some embodiments, the divider is unitary with the sidewall. In some embodiments, the divider is disposed substantially midway between the two entrance openings. In some embodiments, the divider is configured to direct rodents toward the rodent capture portion. In some embodiments, the divider has a first end and a second end disposed closer to the rodent capture portion than the first end. In some embodiments, the second end of the divider is a greater distance from the center of one of the two openings than at least a portion of the first end of the divider. In some embodiments, a distance between the second end of the divider and the center of the one of the two openings is at least 30% greater than the distance between the second end of the divider and the center of the one of the two openings. In some embodiments, the divider includes a surface extending from the second end to the first end.

In some embodiments, the chamber has at least one secondary opening sized differently than the entrance opening. In some embodiments, the at least one secondary opening is shaped differently than the at least one entrance opening. In some embodiments, the at least one secondary opening is smaller than the at least one entrance opening. In some embodiments, the at least one secondary opening includes a plurality of secondary openings that are each smaller than the at least one entrance opening.

In some embodiments, at least one of the base and the lid comprises a sidewall at least partially defining an external perimeter of the apparatus, the sidewall configured to discourage a rodent from climbing onto the lid of the apparatus. In some embodiments, the base comprises the sidewall. In some embodiments, the sidewall is configured to direct a rodent toward the at least one entrance opening. In some embodiments, the sidewall has a height, and an upper portion of the sidewall disposed outwardly of a lower portion of the sidewall by a distance of at least 20 percent of the height. In some embodiments, the sidewall includes a surface extending from the lower portion to the upper portion. In some embodiments, the surface is substantially straight between the lower portion and the upper portion. In some embodiments, the surface includes a concave-shaped first portion and a substantially straight second portion.

In some embodiments, at least one of the base and the lid comprises at least one protrusion extending outwardly relative to the chamber, the at least one protrusion configured to discourage a rodent from traveling in at least one non-vertical direction away from the at least one entrance opening.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The embodiments of the present pest-management apparatuses and their components shown in the figures are drawn to scale for at least the depicted embodiment.

FIG. 12 depicts a side orthogonal view of the apparatus of FIG. 11 with a lid in an open configuration.

FIG. 13 depicts a side cross section view of the apparatus of FIG. 11 in the open configuration, taken along line A-A of FIG. 11.

DESCRIPTION OF ILLUSTRATIVE EMBODIMENTS

Figure 1:
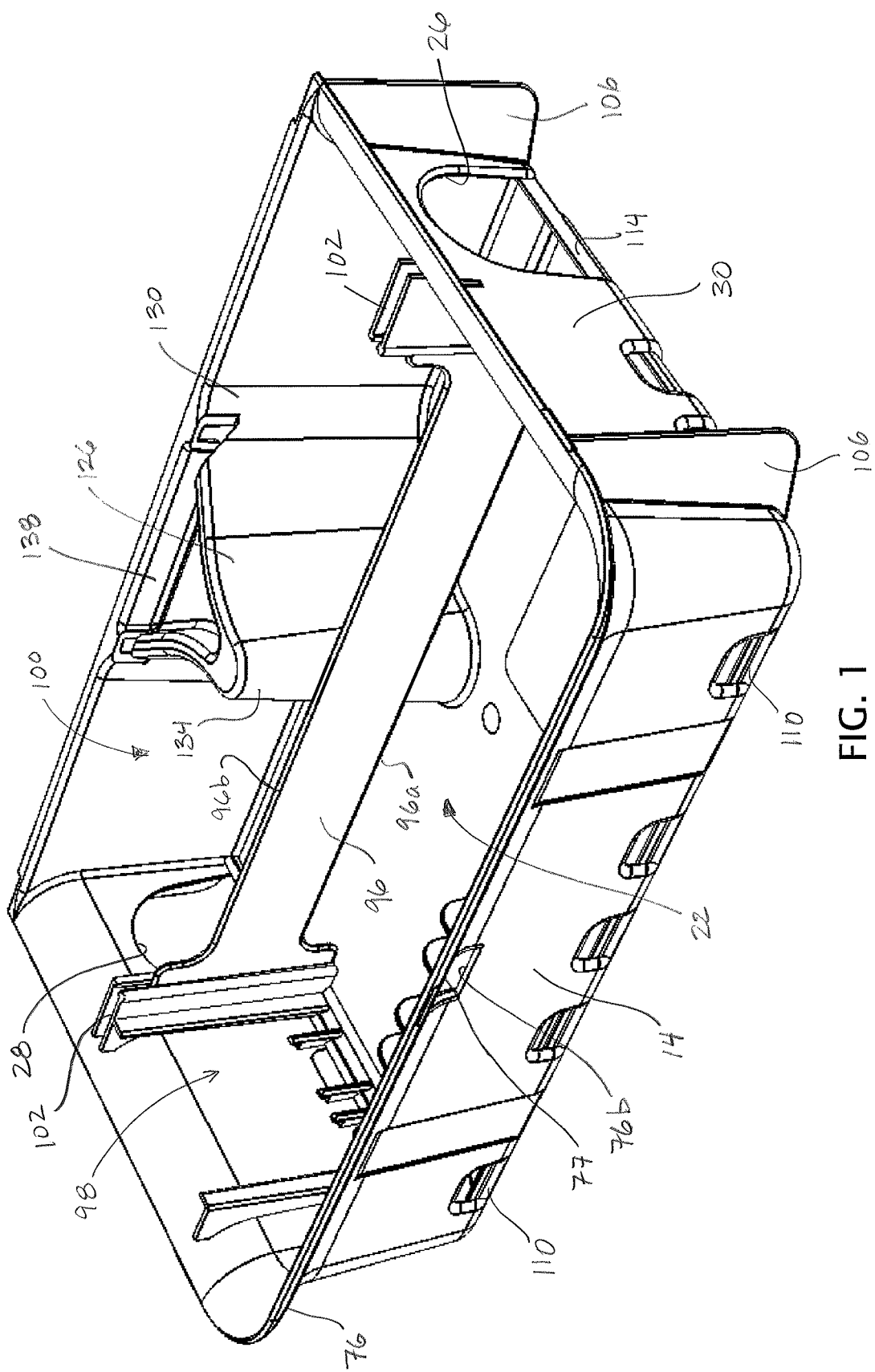
FIGS. 1 and 2 depict perspective and top views, respectively, of a base of a first embodiment of the present pest-management apparatuses.
Figure 2:
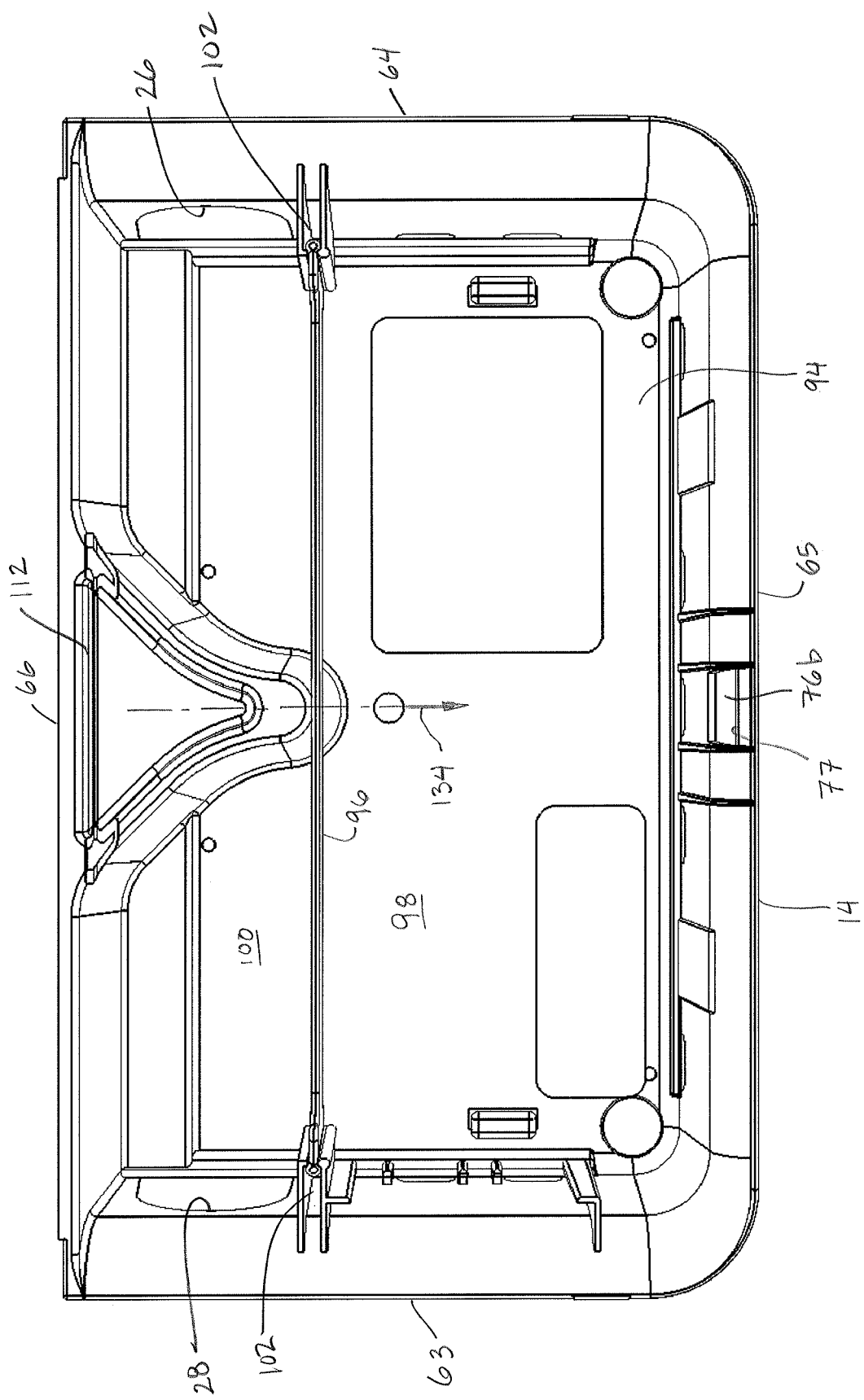
Figure 3A:
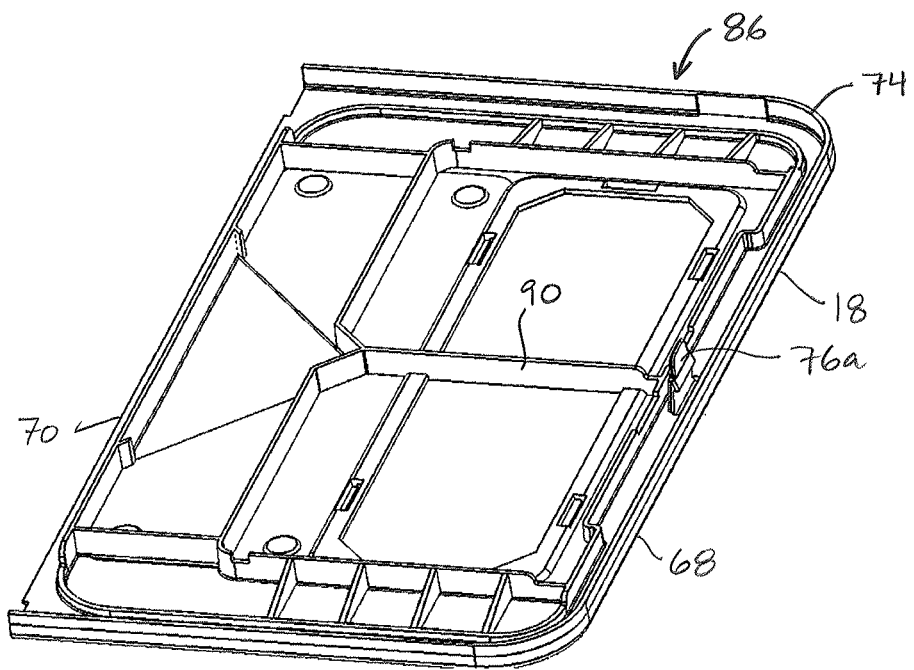
FIGS. 3A and 3B depict lower and upper perspective views, respectively, of a lid the apparatus of FIG. 1.
Figure 3B:
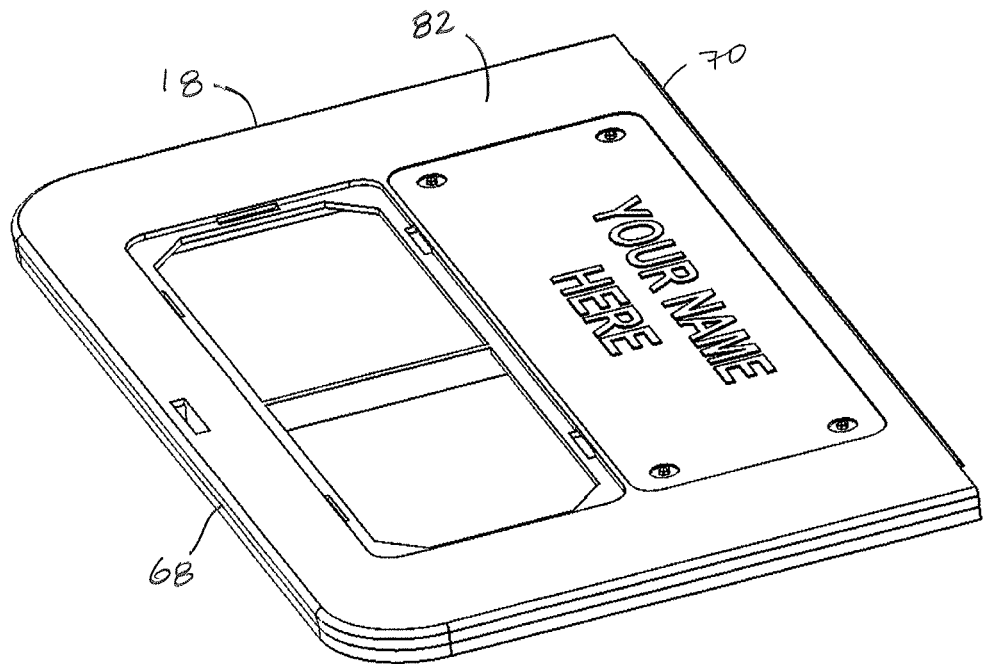
Figure 4:
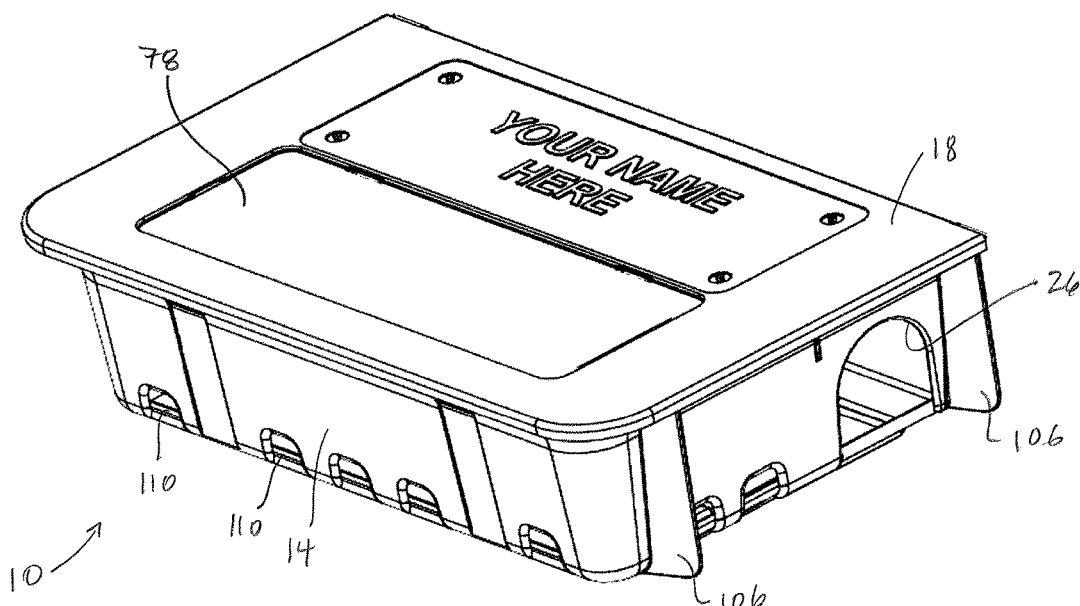
FIG. 4 depicts an upper perspective view of the apparatus of FIG. 1 with the lid in a closed configuration.
Figure 5:
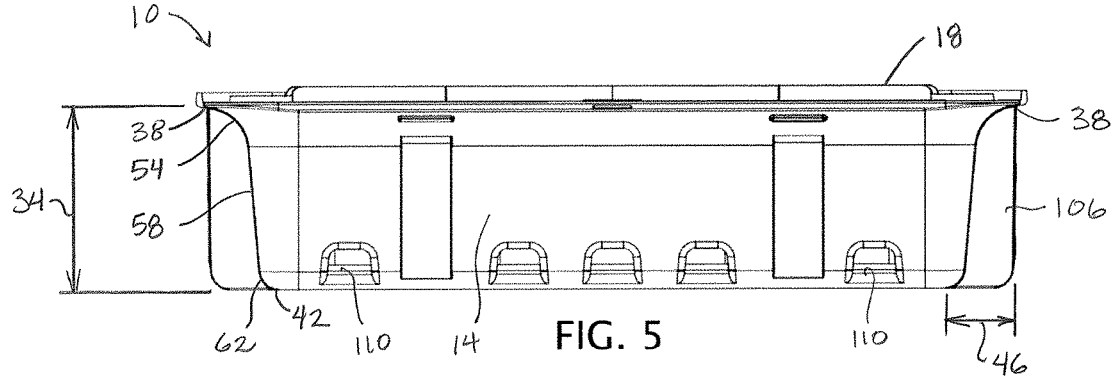
FIG. 5 depicts a front orthogonal view of the apparatus of FIG. 1 with the lid in a closed configuration.
Figure 6:
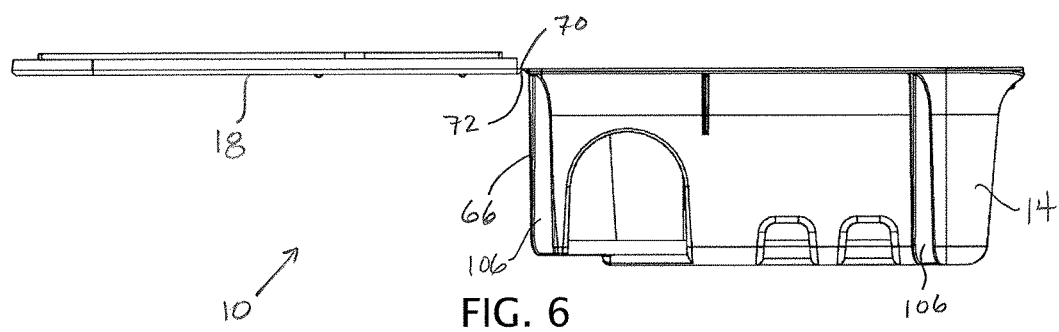
FIG. 6 depicts a side orthogonal view of the apparatus of FIG. 1 with the lid in an open configuration.
Figure 7:
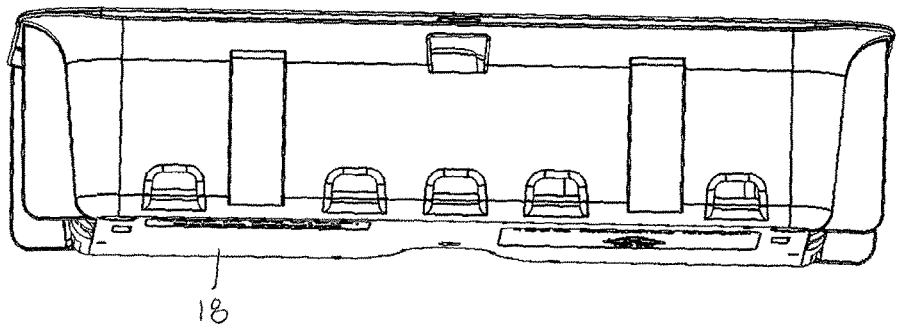
FIG. 7 depicts a front perspective view of the apparatus of FIG. 1.
Figure 8:
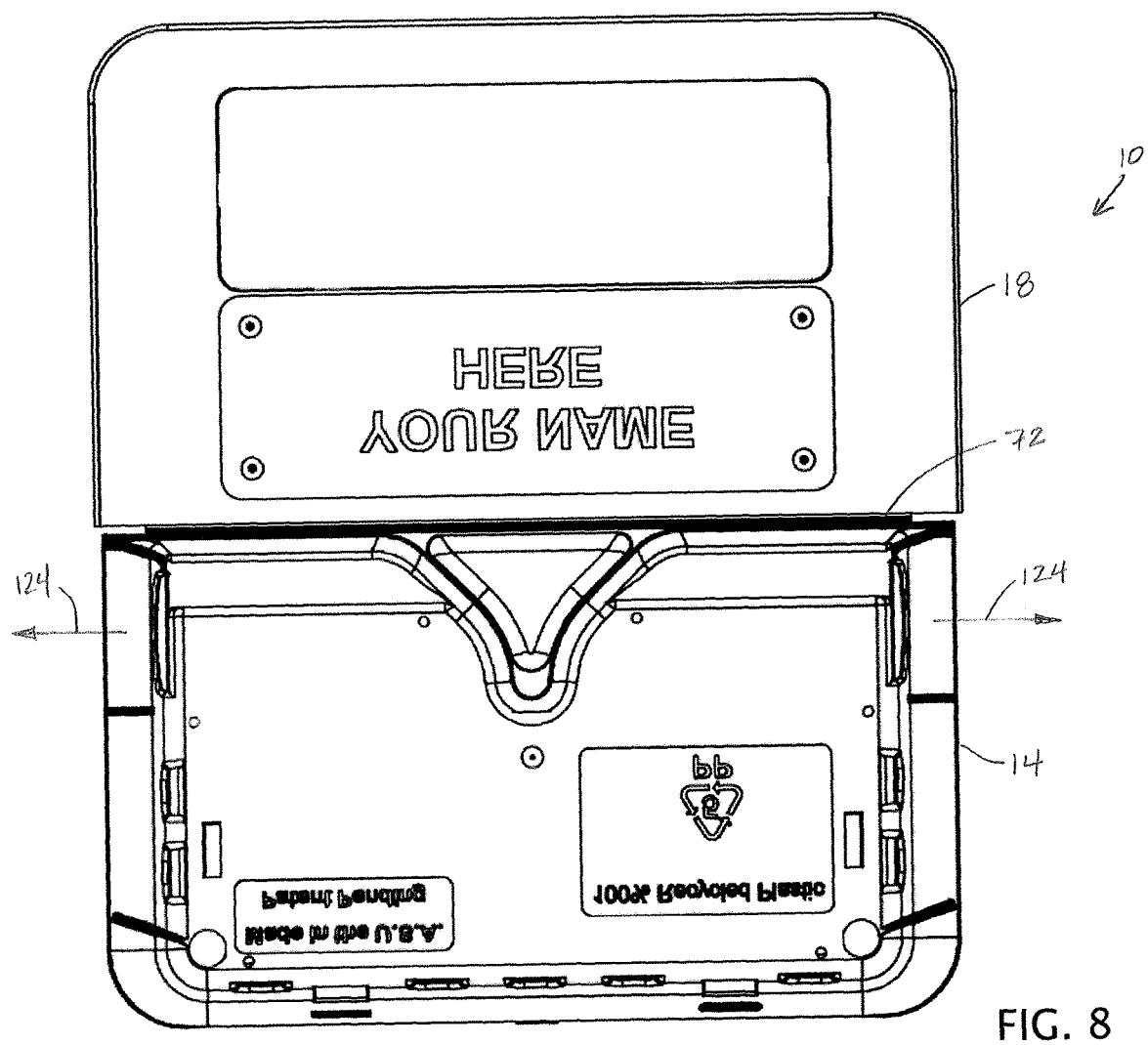
FIG. 8 depicts a bottom orthogonal view of the apparatus of FIG. 1 with the lid in an open configuration.
Figure 9:
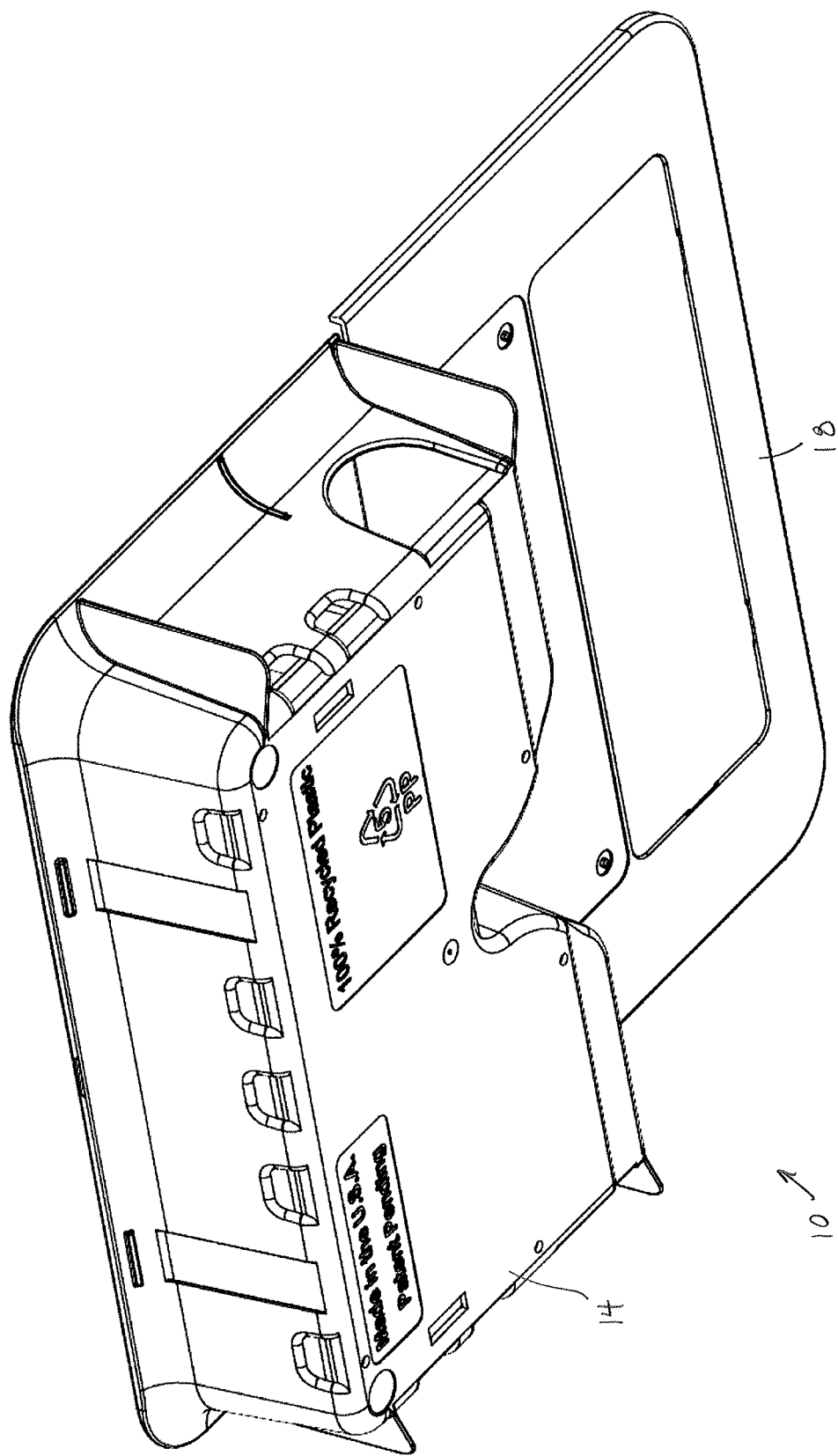
FIG. 9 depicts a lower perspective view of the apparatus of FIG. 1 with the lid in an open configuration.
Figure 11:
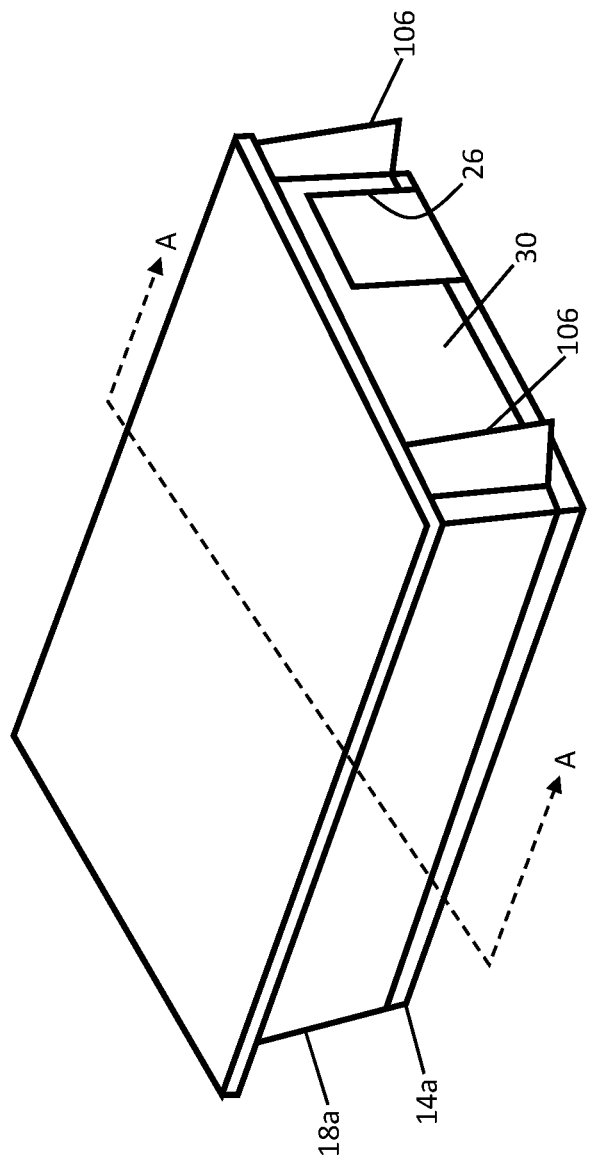
FIG. 11 depicts a schematic perspective view of a second embodiment of the present pest-management apparatuses.

Referring now to the drawings, and more particularly to FIGS. 1-9, shown therein and designated by the reference numeral 10 is one embodiment of the present pest-management apparatuses. In the embodiment shown, apparatus 10 comprises a base 14 and a lid 18 configured to be coupled to (e.g., is shown in FIGS. 4-9 coupled to) base 14 such that the base and the lid cooperate to define (e.g., when the lid and base are coupled together in a closed configuration, as is shown in FIG. 4) a chamber 22 having at least one entrance opening 26 sized to permit a rodent to enter apparatus 10 (e.g., chamber 22) through opening 26. In some embodiments, base 14 and lid 18 may cooperate to define a chamber having a plurality of (e.g., more than one) entrance openings. For example, in the embodiment shown, base 14 and lid 18 cooperate to define a chamber 22 having a second entrance opening 28. In the embodiment shown, base 14 and lid 18 cooperate to define a chamber 22 having entrance openings 26 and 28 when base 14 and lid 18 are coupled together in a closed configuration (FIG. 4). In the depicted embodiment, entrance openings 26 and 28 are formed only in base 14. Accordingly, one or both of entrance openings 26 and 28 may each be entirely defined by only one of the lid and the base (e.g., the entire perimeter of the respective opening may be defined by only one of the lid and the base). However, in other embodiments (such as the embodiment shown in FIGS. 11-13), one or both of entrance openings 26 and 28 may each be cooperatively defined by the base and the lid (e.g., when the lid is in a closed configuration relative to the base).

In some embodiments, at least one of base 14 and lid 18 (e.g., base 14, in the embodiment shown in FIGS. 1-10, or lid 18a, in the embodiment shown in FIGS. 11-13) comprises a sidewall 30 at least partially defining an external perimeter of apparatus 10, and configured to discourage a rodent (e.g., at or near sidewall 30) from climbing onto lid 18. More particularly, in some embodiments, at least one of base 14 and lid 18 (e.g., base 14, in the embodiment shown in FIGS. 1-10, or lid 18a, in the embodiment shown in FIGS. 11-13) comprises a sidewall 30 at least partially defining an external perimeter of apparatus 10, and configured with at least a curved portion (e.g., first portion 54) to discourage a rodent (e.g., at or near sidewall 30) from climbing onto lid 18. In the embodiment shown, at least portions of sidewall 30 can also be described as being configured to direct a rodent toward a respective entrance opening 26 or 28. In the embodiment shown, sidewall 30 has a height 34, and an upper portion 38 of sidewall 30 is disposed outwardly (e.g., relative to chamber 22) of a lower portion 42 of the sidewall by a distance 46 (see FIG. 5) of at least 20 percent (e.g., 25, 30, 35, 40, 45, or more percent) of height 34. In the embodiment shown, sidewall 30 includes a surface 50 extending from lower portion 42 to upper portion 38. In the embodiment shown, surface 50 includes a curved (e.g., a concave or substantially arcuate) first portion 54, a substantially straight second portion 58, and a curved (e.g., a convex or substantially arcuate) third portion 62. In other embodiments, surface 50 can have any suitable shape (e.g., can be substantially straight between the lower portion and the upper portion, curved (e.g., concave or convex, including substantially arcuate) between the lower portion and the upper portion, and/or the like).

In the embodiment shown, base 14 can be described as having a left side 63, a right side 64, a front 65, and a back 66. In the embodiment shown, the portions of sidewall 30 along left side 63, right side 64, and front 65 all have substantially similar shapes or profiles, as described above and depicted, for example, in FIG. 5. In the embodiment shown, back 66 has a profile or shape that is different than the shape or profile of left side 63, right side 64, and front 65. In the embodiment shown, back 66 is configured so that it may be disposed adjacent to a substantially vertical surface (e.g., a wall) exterior to apparatus 10 such that the space between back 66 and the substantially vertical surface is minimized (e.g., such that a portion, up to and including all, of back 66 is in contact with the surface). In such embodiments, back 66 may be described as vertically-oriented, or, more specifically, oriented vertically relative to floor 94 of base 14. In other embodiments, back 66 may have a shape or profile that is substantially similar to that of sides 63, 64 and/or front 65 (e.g., that is configured to discourage a rodent from climbing onto lid 18, and/or to direct a rodent toward entrance opening 26 and/or entrance opening 28, and/or the like).

In some embodiments, lid 18 has a first end or edge 68 and a second end or edge 70, and one of end 68 and end 70 is coupled (e.g., pivotally, detachably, etc.) to base 14. For example, in the embodiment shown, edge 70 is coupled to base 14 along back 66. In other embodiments, lid 18 may be configured to be coupled to base 14 along any one or more of sides 63, 64 or front 65. In some embodiments, lid 18 may be configured to be coupled to two or more of sides 63 and 64, front 65, and/or back 66 of base. In the embodiment shown, lid 18 is unitary with base 14 (e.g., base 14 and lid 18 comprise a single piece of material in which lid 18 is pivotally coupled to base 14 via living hinge 72). In the embodiment shown, end 68 of lid 14 is configured to be detachably coupled to base 14 by a lip 74 that is configured to extend around and contact a peripheral edge 76 of base 14 (e.g., when lid 18 is in a closed configuration relative to base 14) to resist separation of the lid from the base (e.g., to resist opening of the lid relative to the base). In other embodiments, lid 18 is configured to be removably coupled to base 14 by at least one latch, lock, and/or the like.

In the embodiment shown, lid 18 comprises at least one transparent viewing window 78 (e.g., one, as shown) through which a user can view at least a portion of chamber 22. In some embodiments, viewing window 78 is at least partially detachable (e.g., via a latch) from lid 18. In some embodiments, viewing window 78 may be unitary with lid 18, such as where the material for lid 18 and window 78 are both transparent. In the embodiment shown, lid 18 comprises a substantially planar portion 82 and a reinforcing portion 86. In the embodiment shown, reinforcing portion 86 comprises one or more ribs 90. In some embodiments, reinforcing portion 86 may comprise any number of reinforcing structures (e.g., ribs, rods, a mesh, etc.) and/or materials (e.g., plastic, steel, aluminum, etc.) configured to reinforce lid 18. In the embodiment shown, reinforcing portion 86 is interior to apparatus 10 when lid 18 is coupled to base 14 in a closed configuration (e.g., FIG. 4). In other embodiments, reinforcing portion 86 may be exterior (e.g., extending outwardly from substantially planar portion 82) to apparatus 10 (e.g., relative to chamber 22) when lid 18 is coupled to base 14 in a closed configuration.

In the embodiment shown, lid 18 comprises a latch 76a configured to resist separation of lid 18 and base 14 when lid 18 is in a closed configuration relative to base 14. For example, in the embodiment shown, latch 76a is configured to engage a corresponding lip or shelf 77 in base 14. In some embodiments, at least one of base 14 and lid 18 comprises a release opening configured to permit a user to release lid 18 relative to base 14 to permit the apparatus to transition from a closed configuration to an open configuration. For example, in the embodiment shown, base 14 comprises release opening 76b that permits a user's finger or other object to extend through release opening to depress latch 76a relative to shelf 77. For example, The at least one of base 14 and lid 18 that comprises the release opening(s) can be configured such that the edge(s) defining the release opening are configured to prevent a user from injury. (e.g., if a user extends a finger through the release opening), such as, for example, via beveled edges, edges comprising a radius, and similarly smoothed edges. For example, in the embodiment shown, the edges of base 14 that define release opening 76*b* are rounded or radiused to eliminate or exclude sharp edges that could otherwise injure or irritate the skin of a user that extends a finger through release opening to release latch 76*a*.

In some embodiments, base 14 comprises a floor 94 configured to prevent movement (e.g., with non-slip material, screws, etc.) of apparatus 10 relative to a surface (e.g., a substantially horizontal surface) on which apparatus 10 is disposed or supported. For example, in some embodiments, a lower or bottom surface of floor may be textured and/or may include a rubber or adhesive surface. In the embodiment shown, floor 94 is unitary with sidewall 30. In other embodiments, floor 94 may be detachably coupled (e.g., via latches) to sidewall 30, or floor 94 may be omitted.

In some embodiments, apparatus 10 comprises one or more separators (e.g., on separators 96, as shown) configured such that if lid 18 and base 14 are coupled together to define chamber 22 (e.g., in a closed configuration), the one or more separators 96 prevent a rodent from accessing at least a portion of the chamber except by climbing over the one or more separators. For example, in the embodiment shown, the separator(s) divide chamber 22 into a first portion 98 (e.g., a rodent capture portion 98, as shown) and a second portion 100 (e.g., an entry portion 100, as shown) and are configured to prevent a rodent from traversing from the entry portion to the rodent capture portion except by climbing over the one or more separators. In the embodiment shown, rodent capture portion 98 and entry portion 100 are in fluid communication. In the embodiment shown, rodent capture portion 98 of chamber 22 is configured to resist a rodent's exit from apparatus 10. For example, in some embodiments, an adhesive (e.g., an adhesive mat) is disposed in rodent capture portion 98 of chamber 22 (e.g., coupled to floor 94).

In other embodiments, the one or more separators can be disposed nearer and/or at an entrance 26 (e.g., at both entrances 26) such that a rodent is prevented from entering the chamber except by climbing over the one or more separators.

In the embodiment shown, separator 96 extends between vertically-oriented grooves 102 defined in the interior of base 14 such that separator 96 can be removed and/or re-inserted (e.g., for replacement) by sliding separator 96 vertically. In other embodiments, separator 96 can be unitary with base 14, or separator can be unitary with lid 18 (e.g., such that the separator extends downward from the lid, extends into chamber 22 when lid 18 is closed relative to base 14, and is removed from chamber 22 when lid 18 is opened relative to base 14).

As noted, separator 96 is configured to prevent a rodent from traversing from entry portion 100 to rodent capture portion 98 except by climbing over the separator. More particularly, in this embodiment, separator 96 comprises an elongated member having a planar configuration with a lower edge 96*a* that is spaced from floor 94 by a distance that is small enough to prevent a rodent from passing under separator. For example, in the embodiment shown, lower edge 96*a* of the separator is spaced from floor 94 by a distance of between 0.25 inches and 0.35 inches. In other embodiments, lower edge 96*a* of the separator can contact floor 94 (e.g., with discrete openings at or above the lower boundary to permit insects to crawl under or through the separator). In other embodiments, lower edge 96*a* can be separated by any distance of less than 0.5 inches (e.g., less than any one of, or between any two of: 0, 0.1, 0.2, 0.3, 0.4, and/or 0.5 inches). In the embodiment shown, an upper edge 96*b* of the separator is disposed at a distance of between 1 and 1.25 inches from floor 94. In other embodiments, upper edge 96*b* can be disposed at any height or distance from the interior floor of the bait station (e.g., between 0.75 and 1.5 inches for mice, or a greater distance for rats) that requires (while still leaving spaced between separator 96 and lid 18 for) a rodent of expected size to have to climb over separator 96 to traverse from entry portion 100 to rodent capture portion 98. In some embodiments, upper boundary 96*b* of the separator is spaced from the lid (when lid 18 is in a closed configuration relative to base 14) by a distance of greater than 0.25 inches (e.g., greater than any one of, or between any two of: 0.25, 0.5, 0.75, and/or 1 inch). For example, in the embodiment shown, when lid 18 is closed relative to base (FIGS. 4-5), upper boundary 96*b* is spaced from a bottom surface of the lid by a distance of between 0.8 and 0.9 inches. In other embodiments, the distance between lid 18 and upper boundary 96*b* can be any suitable distance that permits a targeted rodent species (e.g., a mouse or rat) to climb over the separator (e.g., is such that it is easier for the rodent to climb over the separator than to crawl under the separator).

In this embodiment, rodent capture portion 98 can be covered with an adhesive and forcing a rodent to climb over separator 96 increases the likelihood of the rodent making sufficient contact with the adhesive to be captured. For example, absent separator 96, a rodent can place a single foot on the adhesive in rodent capture portion 98 and may be able to withdraw the single foot upon realizing that the adhesive is present. In contrast, in the present embodiments, the rodent is forced to commit to entering rodent capture portion 98 by climbing over separator 96, thereby increasing the likelihood that at least two of the rodent's feet will contact the adhesive and the rodent will be captured and prevented from escaping. In the embodiment shown, separator 96 is disposed such that the width (measured in a direction extending from front 65 to back 66) of entry portion 100 is less than a length (measured in a direction extending from side 63 to side 64) of entry portion 100, and may be sized (e.g., with a width that is small enough) to discourage rodents within a certain size range from turning around in entry portion 100 (and thereby from exiting apparatus 10 without entering and/or becoming trapped in rodent capture portion 98).

In some embodiments, separator 96 includes a reflective surface. For example, in the planar configuration of separator 96, the side of separator 96 that faces entry portion 100 can be reflective (e.g., can be covered with a reflective paint, reflective tape).

In some embodiments, separator 96 comprises a translucent material (e.g., a transparent material) to allow a rodent to partially and/or entirely see through at least part of the separator, such as, for example, to resist a rodent's reluctance to climb over the separator.

In some embodiments, at least one of base 14 and lid 18 (e.g., base 14, in the embodiment shown in FIGS. 1-10, or lid 18*a*, in the embodiment shown in FIGS. 11-13) comprises at least one protrusion (e.g., two protrusions, three protrusions, or more) extending outwardly relative to chamber 22. For example, in the embodiment shown in FIGS. 1-10, base 14 comprises a plurality of protrusions 106 configured to discourage a rodent from traveling in at least one non-vertical (e.g., horizontal) direction away from entrance opening 26 and/or entrance opening 28. In the embodiment shown, protrusions 106 are unitary with base 14 (e.g., sidewall). In other embodiments, protrusion(s) 106 may be releasably and/or adjustably coupled to at least one of base 14 and lid 18. In the embodiment shown, two protrusions 106 extend from each of sides 63 and 64, with one protrusion at or relatively near front 65 and another protrusion at or relatively near back 66. In other embodiments, protrusion(s) 106 may extend from any suitable portion of base 14 (e.g., any suitable position along sidewall 30, such as, for example, front 65). In the embodiment shown, protrusions 106 extend along substantially the entire height 34 of sidewall 30. In other embodiments, protrusions 106 may extend less than the entire height 34 (e.g., may be vertically shorter than sidewall 30) while still being configured to discourage a rodent from traveling in at least one non-vertical direction away from entrance opening 26 and/or entrance opening 28. In the embodiment shown, protrusions 106 are substantially planar. In other embodiments, protrusion(s) 106 can have any shape (e.g., curved, triangular, etc.) configured to discourage a rodent from traveling in at least one non-vertical direction away from an entrance opening (e.g., 26 or 28). Protrusions 106 may each be disposed at a non-parallel angle (e.g., 90, 75, 60, 45, 30, or less degrees) relative to the portion of sidewall 30 from which the protrusion extends. For example, in the embodiment shown, each protrusion 106 is disposed at an angle of between 60 and 90 degrees relative to the part of sidewall 30 from which it extends, and is substantially perpendicular to floor 94 of the base.

In some embodiments, base 14 and lid 18 cooperate to define a chamber (e.g., 22) having at least one secondary opening 110 (e.g., a plurality of secondary openings 110, as shown) sized differently (e.g., smaller, as shown) than at least one entrance opening (e.g., 26 and/or 28). For example, in the embodiment shown, base 14 defines secondary openings 110. Secondary opening(s) 110 may also be shaped differently than at least one entrance opening (e.g., 26, 28). In other embodiments, the secondary openings can comprise multiple shapes (e.g., square, triangular, circular, etc.). In the embodiment shown, secondary opening 110 are configured to allow pheromones to escape chamber 22 (e.g., to attract pests toward apparatus 10). For example, in the embodiment shown, apparatus 10 is shown with a container (e.g., a tube) 112 configured to hold and release pheromones (and/or scented bait) to attract rodents to apparatus 10. In some embodiments, secondary opening 110 may be configured to allow pests (e.g., cockroaches, scorpions, spiders) smaller than a rodent to enter apparatus 10 (e.g., into chamber 22) while preventing rodents from entering the apparatus through the secondary openings.

In some embodiments, apparatus 10 is configured to prevent liquid below a certain level from entering chamber 22 through the at least one entrance opening (e.g., 26 and 28) and the secondary openings (e.g., 110). For example, in the embodiment shown, the bottom or lowermost portions of each of entrance openings 26 and 28, and of secondary openings 110 are disposed a distance above the bottom of floor 94 (e.g., as defined by a raised edge 114) to resist and/or prevent liquid on a surface on which the apparatus is disposed from entering through the openings.

In the embodiment shown, entry portion 100 of chamber 22 is in fluid communication with entrance opening 26 and with entrance opening 28. In the embodiment shown, entry portion 100 provides an entryway for a rodent entering through one of entrance openings 26, 28 to access rodent capture portion 98. In the embodiment shown, entrance openings 26 and 28 are disposed on substantially opposite sides (e.g., right side 64 and left side 63, respectively) of apparatus 10. In this embodiment, entrance opening 26 and entrance opening 28 are configured such that an axis 124 extends through both of openings 26 and 28 (e.g., such that axis 124 is substantially parallel to floor 94). In other embodiments, axis 124 may extend through the entrance openings at an angle that is not perpendicular (e.g., 75, 60, 45, or less degrees) to the respective planes of openings 26 and 28. In other embodiments, entrance openings 26 and 28 may be disposed at any suitable positions relative to sides 63 and 64, front 65, and/or back 66.

In some embodiments, at least one of base 14 and lid 18 (e.g., base 14, in the embodiment shown in FIGS. 1-10, or lid 18a, in the embodiment shown in FIGS. 11-13) comprises at least one divider disposed in entry portion 120. For example, in the embodiment shown in FIGS. 1-10, base 14 includes a divider 126 that is configured to prevent a rodent from entering apparatus 10 through one entrance opening (e.g., 26) and exiting apparatus 10 through another entrance opening (e.g., 28) without first passing through rodent capture portion 119. In the embodiment shown, divider 126 is further configured to prevent a rodent outside apparatus 10 from seeing one entrance opening (e.g., 28) through the other entrance opening (e.g., 26). In the embodiment shown, divider 126 is further configured to encourage rodents (e.g., in entry portion 100) to enter rodent capture portion 98. In some embodiments, divider 126 extends inward from and/or is coupled (e.g., releasably, detachably, etc.) to sidewall 30. For example, in the embodiment shown, divider 126 is unitary with sidewall 30. In the embodiment shown, divider 126 is disposed substantially midway between entrance opening 26 and entrance opening 28. In other embodiments, divider 126 may be disposed closer to one entrance opening than another entrance opening. In the embodiment shown, divider 126 has a first end 130 and a second end 134 disposed closer to rodent capture 100 portion than first end 130. In the embodiment shown, first end 130 is wider than second end 134. In the embodiment shown, divider 126 is symmetric about an axis 136 such that divider 126 appears substantially similar whether viewed through entrance opening 26 or entrance opening 28. In the embodiments, second end 134 of divider 126 is a greater distance from the center of entrance opening 26 than at least a portion of first end 130. In some embodiments, first end 130 and second end 134 are substantially the same distance from the center of entrance opening 26. In the embodiment shown, an upper portion of divider 126 includes a recess 138 configured to receive container 112 with and/or directly receive pheromones and/or bait (e.g., scented bait) configured to attract rodents.

Figure 10:
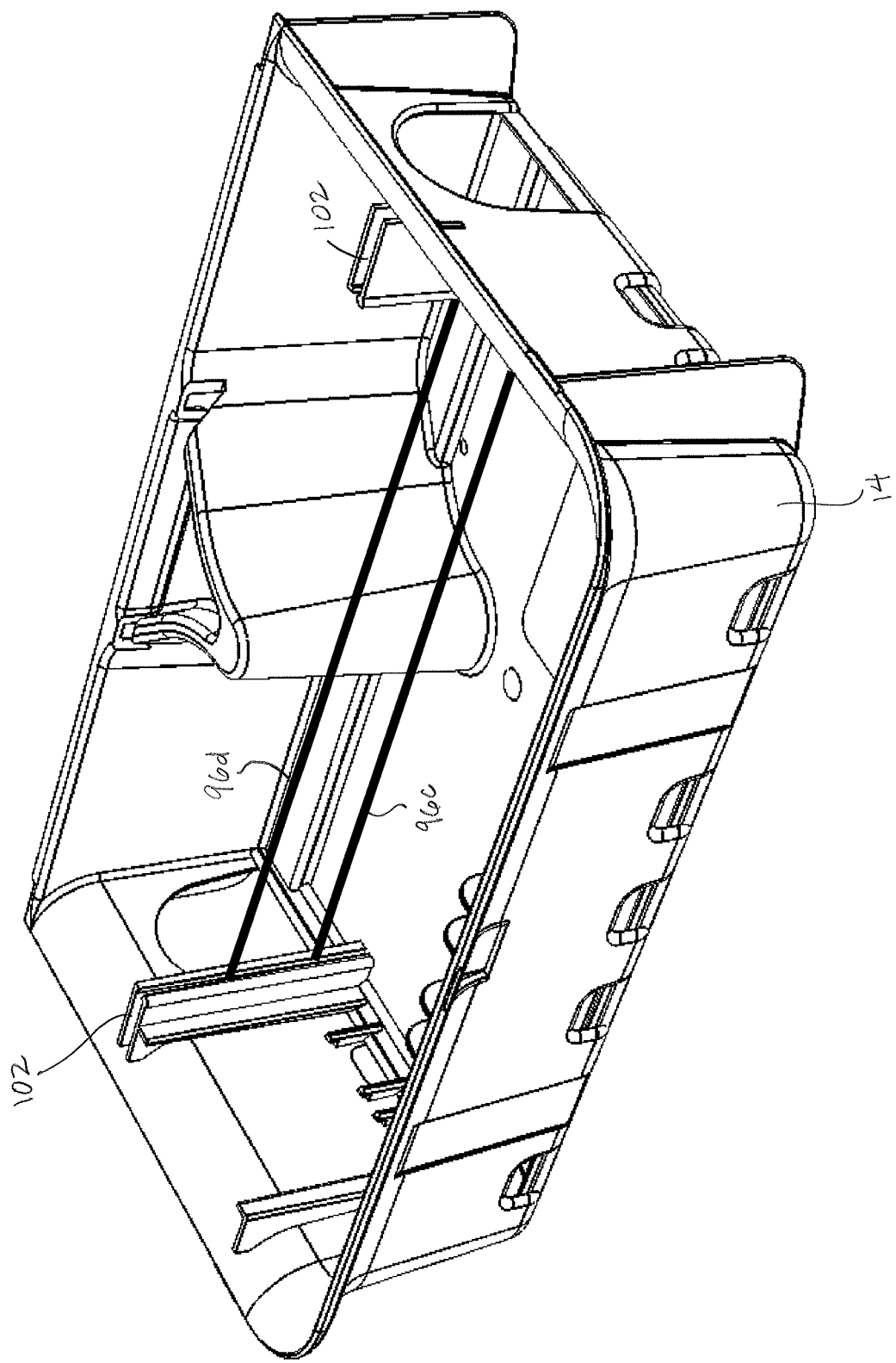
FIG. 10 depicts a perspective view of a base of a second embodiment of the present pest-management apparatuses.

FIG. 10 depicts apparatus 10a having a base 14, a lid 18, and an alternate embodiment of the present separators. In this embodiment, apparatus 10a comprises two separators: a lower wire 96c and an upper wire 96d. Together, wires or separators 96c and 96d function similarly to separator 96, with lower wire 96c positioned similarly to lower edge 96a of separator 96, and with upper wire 96d positioned similarly to upper edge 96b of separator 96.

In the embodiments shown, apparatuses 10 and 10a (e.g., at least one of and/or both of base 14 and lid 18, respectively) may comprise plastic. For example, in some embodiments, base 14 and/or lid 18 comprise a plastic selected from the group consisting of: polypropylene (PP), polystyrene (PS), high impact polystyrene (HIPS), acrylonitrile butadiene styrene (ABS), polyethylene terephthalate (PET), polyvinyl chloride (PVC), polycarbonate (PC), polyethylene (PE), and polycarbonate/acrylonitrile butadiene styrene (PC/ABS), polycarbonate polybutylene terephthalate (PBT), acrylonitrile styrene acrylate (ASA), polyurethanes, nylon (often referred to as polyamide (PA)), combinations thereof, and/or other plastics or polymers. In at least some embodiments, base 14, lid 18, and/or separator 96 (or separators 96c and/or 96d) comprises a scented plastic (e.g., a plastic embedded with a scent that mimics peanut butter, apple, or another scent that is selected to attract rodents. In other embodiments, the present apparatuses (e.g., at least one of and/or both of base 14 and lid 18, respectively) comprise a non-plastic material, such as, for example, a metal (e.g., steel, iron, aluminum, copper, brass, or the like), fiberglass, carbon fiber, synthetic materials, and other suitably durable or rigid materials.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A pest-management apparatus comprising:
   a base;
   a lid configured to be coupled to the base such that the base and the lid cooperate to define a chamber having at least one entrance opening sized to permit a rodent to enter the apparatus;
   a divider extending from one of the lid and the base; and
   one or more separators, each having a length, configured to be coupled to the base such that if the lid and base are coupled together to define the chamber, the one or more separators:
      separate the chamber into a first portion within which the divider is disposed and a second portion;
      are positioned relative to the divider to prevent a rodent from traversing the first portion of the chamber between the one or more separators and the divider;
      prevent a rodent from accessing at least the second portion of the chamber except by climbing over the one or more separators, and
      permit the rodent to climb over a majority of the length(s) of the one or more separators.

2. The apparatus of claim 1, where a lower boundary of the one or more separators contacts a floor of the base.

3. The apparatus of claim 1, where a lower boundary of the one or more separators is spaced from a floor of the base.

4. The apparatus of claim 3, where an upper boundary of the one or more separators is spaced from the lid by a distance of greater than 0.25 inches.

5. The apparatus of claim 1, where the one or more separators comprise a translucent material or a transparent material.

6. The apparatus of claim 1, where the one or more separators comprise an elongated member having a planar configuration.

7. The apparatus of claim 1, where the base defines two grooves configured to receive portions of the one or more separators.

8. The apparatus of claim 1, where at least one of the base and lid comprises a scented plastic.

9. The apparatus of claim 1, where the first portion is configured to resist a rodent's exit from the apparatus.

10. The apparatus of claim 1, where the one or more separators are substantially perpendicular to the base.

11. The apparatus of claim 1, where the apparatus comprises two entrance openings.

12. The apparatus of claim 11, where the two entrance openings are disposed on substantially opposite sides of the apparatus.

13. The apparatus of claim 11, where the divider is configured to prevent a rodent from entering the apparatus through one of the two openings and exiting the apparatus through the other of the two openings without first passing through a rodent capture portion of the chamber.

14. The apparatus of claim 13, where the divider is further configured to prevent a rodent outside the apparatus from seeing one of the two openings through the other of the two openings.

15. The apparatus of claim 13, where at least one of the base and the lid comprises a sidewall, and the apparatus is configured such that if the lid is coupled to the base in a closed configuration, the divider extends from the sidewall.

16. The apparatus of claim 15, where the divider is unitary with the sidewall.

17. The apparatus of claim 1, where the chamber has at least one secondary opening sized differently than the entrance opening.

18. The apparatus of claim 1, where at least one of the base and the lid comprises a sidewall at least partially defining an external perimeter of the apparatus, the sidewall configured to discourage a rodent from climbing onto the lid of the apparatus.

19. The apparatus of claim 1, where at least one of the base and the lid comprises at least one protrusion extending outwardly relative to the chamber, the at least one protrusion configured to discourage a rodent from traveling in at least one non-vertical direction away from the at least one entrance opening.

20. The apparatus of claim 1, wherein the base comprises a solid floor.

21. The apparatus of claim 1, where at least one of the one or more separators has a constant height along a majority of the length.

* * * * *